Jan. 2, 1940. C. REIMULLER 2,185,313
ELECTRICAL SNUBBING DEVICE
Filed Aug. 1, 1938
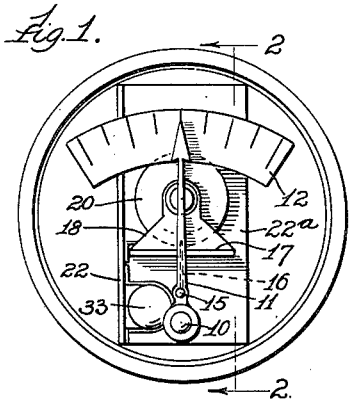
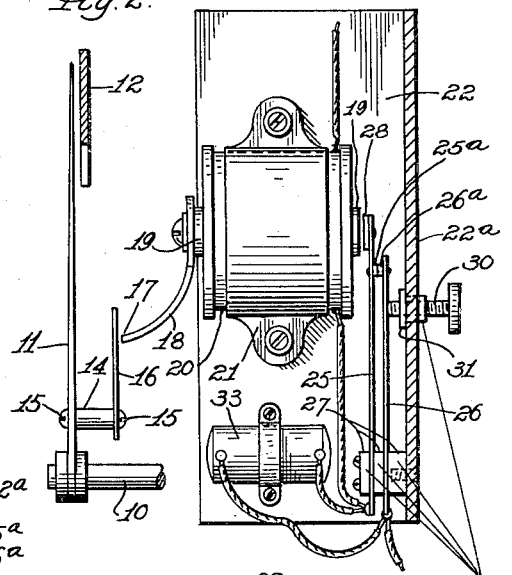
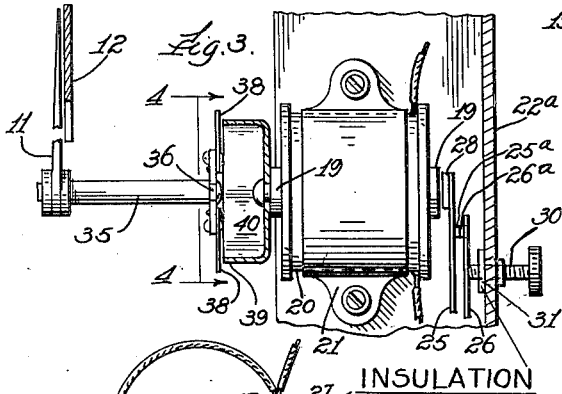
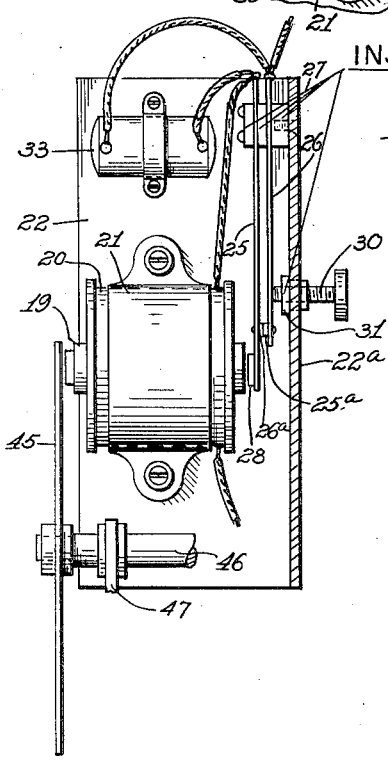
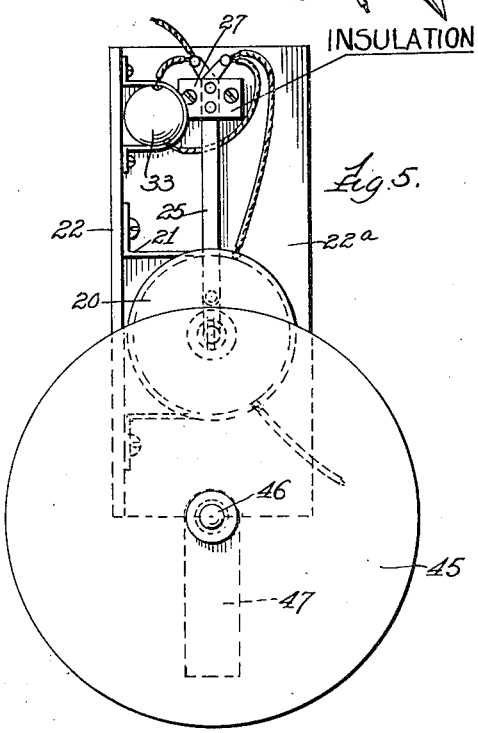
Inventor
Christian Reimuller
by A. W. Molinare
his Attorney Patented Jan. 2, 1940

2,185,313

UNITED STATES PATENT OFFICE 2,185,313

ELECTRICAL SNUBBING DEVICE

Christian Reimuller, Wilmette, Ill.

Application August 1, 1938, Serial No. 222,565

18 Claims. (Cl. 188—164)

The present invention relates to snubbing devices, and more particularly to electrically actuated snubbing devices for controlling the motion of a movable element, such as the oscillating motion of a pointer or dial, as commonly used in instruments, balances, meters, weighing scales of various types, or the rotation of a disc in various devices, such as is used in certain types of meters.

One of the primary objects of this invention is to provide an improved snubbing device of the character indicated, which is constructed for actuation by periodic impulses of direct current, for effectively dampening, retarding or controlling the motion of a movable element.

Another object is to provide an improved electrically actuated snubbing device, operable by periodic impulses of direct current, the action of which device is substantially constant or uniform, irrespective of variations in atmospheric pressure or temperature.

A further object resides in the provision of an improved snubbing device, operable by periodic impulses of direct current, and which efficiently functions to dampen or retard motion of an oscillating element, such as a pointer or dial, in such a stabilizing manner as not to affect the true zero or equilibrium position that the pointer or dial tends to attain.

Still another object is to provide an improved snubbing device of the character indicated, especially suitable for relatively delicate or sensitive meters or other measuring devices, and which is constructed to exert a balanced snubbing action on the shaft carrying the movable indicator or dial.

Other objects and advantages will be apparent from the following description, taken in connection with the accompanying drawing in which:

Figure 1 is a face view of a meter, with certain front parts omitted, equipped with the snubbing device constituting the present invention.

Figure 2 is an enlarged fragmentary vertical section, taken as indicated at line 2—2 on Figure 1, showing the snubbing device in side elevation.

Figure 3 is a sectional view, similar to Figure 2, showing a modified construction, for use in connection with a relatively sensitive or delicate meter.

Figure 4 is a detail section, taken as indicated at line 4—4 on Figure 3.

Figure 5 is a face view of a rotating disc mechanism and snubbing device, embodying this invention.

Figure 6 is a side elevation of the mechanism shown in Figure 5.

The construction disclosed in Figures 1 and 2 is of the type readily adaptable for use in connection with various types of meters and weighing scales, and includes an oscillatable shaft 10 journaled in suitable bearings (not shown). Rigidly mounted on, and movable with, said shaft is an indicator element 11 the end of which is positioned in overlapping relation to the graduated face of a fixed, segmental dial element 12. It is to be understood that in certain meter or scale devices the indicator element may be fixed and the dial element mounted for rotation about an axis. Fixedly connected to, and bodily movable with, the indicator element 11 preferably adjacent shaft 10 by any suitable means, such as by a spacer 14 and screws 15 is a flexible snubbing member 16 of magnetic material, such as iron, and which may be in the form of a wire. The free end of the snubbing member is disposed in close proximity to the face 17 of a head 18 which is directly attached to, and constitutes an extension of, the core 19 of an electro-magnet 20 which is secured by a clip bracket 21 to a mounting bracket 22. The face 17 of the head 18 is of substantial length to insure periodic engagement by the snubbing member 16 throughout its entire range of oscillation.

The electro-magnet is adapted to be energized by impulses of direct current of relatively high frequency, for periodically attracting and releasing the snubbing member 16 to the head 18 of the core of said electro-magnet, which acts electro-mechanically to intermittently hold the snubbing member 16 for dampening and retarding the motion of the said member, together with the movable indicator 11. It will be apparent that this arrangement serves to shorten or diminish the amplitude or period of oscillation of the indicator element 11 in a step-by-step manner, and thereby retards the motion of said indicator element and associated parts in an expeditious manner, without impairing the accuracy of the final or arrested position of the indicator element or other member being snubbed.

The means for continuously interrupting the direct current electrical circuit of the electro-magnet includes a pair of flexible conductor strips 25, 26 disposed in parallel relation and having respectively contact points 25ª, 26ª normally engaged to complete the circuit including the electromagnet. Said conductor strips are connected in series with the electro-magnet and have their corresponding ends mounted between the blocks 27 of insulating material, rigidly secured to the flange 22ᵃ of the support bracket 22. Conductor strip 25 is somewhat longer than strip 26 and has its end provided with a plug 28 of magnetic material, such as iron, disposed in close proximity to the outer end of the core 19 of the electro-magnet 20. It will now be seen that the direct current may first flow through conductor strip 26 to conductor 25 by reason of engagement of points 25ᵃ, 26ᵃ and thence to the coil of the electro-magnet for energizing it, by virtue of which the core 19 is magnetized, causing attraction of the snubbing member 16 to the face of the head 18 of the core 19 and, simultaneously, attracting the plug 28 to the opposite end of said core. The attraction of the member 16 to the head 18 is periodic, because the electric circuit, energizing the electro-magnet, is rapidly made and broken as the member 25 moves, by attraction of its plug 28 to the core of the magnet, separating the points 25ᵃ, 26ᵃ. Upon breaking of the circuit, conductor strip 25 returns to the position seen in Figure 2, again closing the circuit through points 25ᵃ, 26ᵃ and repeating, in step-by-step fashion, the period attraction of the snubbing member 16 to the head 18 of the core 19. The frequency of making and breaking of the circuit may be varied by the size or thickness of the strips 25 and 26 or by the fixed position of the element 26 which may be conveniently varied by a set screw 30 threaded through an insulating bushing 31 in the flange 22ᵃ of the bracket 22 and having its end engaging said conductor strip 26 as seen in the drawing. To reduce arcing at the contact points 25ᵃ, 26ᵃ a condenser 33 mounted on bracket 22 is connected in parallel across the conductor strips 25, 26.

The construction disclosed in Figures 3 and 4 is especially suitable for use in connection with extremely delicate or sensitive instruments or meters. For such use I have, for the purpose of illustration, again shown a calibrated dial element 12 in fixed position, and a movable indicator 11 fixedly attached to an oscillating or rotating shaft 35 and which shaft may be understood as constituting an important part of the meter. To preclude slight inaccuracy in relatively sensitive meters, which might result by temporarily applying a slight torque to the shaft, for retarding its motion, I preferably apply the torque in a substantially balanced manner so as to have no effect whatever on the position that the indicator element 11 tends to attain. For this purpose the end of shaft 35 has an element 36 fixedly mounted thereon, providing a pair of diametrically oppositely extending arms, to which are rigidly connected the ends of a pair of oppositely extending flexible snubbing members 38 of magnetic material, such as iron wire. Said pair of snubbing members is disposed in overlapping relation and in close proximity to the face edge 39 of a cup-shaped member 40 which, as seen in Figure 3, is rigidly attached to the end and constitutes a part of the core 19 of the electro-magnet 20. Said snubbing members are periodically attracted to the face edge of the cup element 40 by intermittent energization of the electro-magnet, which may be attained by means as above described, when direct current is employed, or by the use of alternating current. Such step-by-step braking engagement of the snubbing members 38 with the element 40 serves to uniformly retard motion of the shaft 35 together with its indicator element, in an expeditious manner, without affecting the accuracy or sensitivity of the meter.

The construction disclosed in Figures 5 and 6 shows an application of my present invention to a rotating disc mechanism, including a rotatable disc 45 mounted on a shaft 46 supported in one or more brackets 47. In this arrangement the disc 45 constitutes the snubbing element, formed of magnetic material, and disposed with one face in close proximity to the face of the core 19 of the electro-magnet 20. It is to be understood that the disc 45 or the shaft 46 are so formed or mounted as to provide a limited amount of axial movement so as to permit free rotation of the disc during alternate periodic attractions thereof to the core of the magnet. The magnet is intermittently energized by direct current by means above described in connection with Figures 1 and 2. Such periodic attraction of the disc to the magnet produces a constant step-by-step braking action on the disc by virtue of which said disc is controlled so as to rotate at a constant or uniform rate of speed, it being understood, of course, that the magnetic field developed at the end of the core 19 is sufficient to overcome the torque supplied to said disc. It will also be apparent that the braking or holding action on the disc occurs for only a relatively small interval of time, due to intermittent breaking of the direct current electrical circuit.

Manifestly, the snubbing members employed in the various forms of the invention disclosed, may be of such form or material as to render them yieldable, or such yielding action may be the result of their form or mounting. It will now be apparent that, by virtue of the construction disclosed, it is possible, in some instances, such as in connection with weighing scales, to also absorb unstable mechanical fluctuations in such structures, and serve to rapidly bring the entire system into a condition of balance or equilibrium.

Although I have shown and described several embodiments of my invention, manifestly it is capable of substantial modification and rearrangement of parts, without departing from the spirit and scope thereof. I do not, therefore, wish to be understood as limiting this invention to the precise forms herein disclosed, except as I may be so limited by the appended claims.

I claim:

1. In an electrical snubbing device of the character indicated, the combination of electro-magnetic means, including a core, adapted to be energized by impulses of direct current, an electrical circuit for said electro-magnetic means including a source of direct current, means including a magnetic element normally disposed in close proximity and adapted to be magnetically attracted to the core of the electro-magnetic means, one of said means being movable relatively to the other, and means for periodically interrupting said direct current supply, whereby said electro-magnetic means is periodically energized for causing periodic attraction and engagement of said magnetic element with the core of said electro-magnetic means for controlling the motion of said movable means.

2. In an electrical snubbing device of the character indicated, the combination of electro-magnetic means, including a core, adapted to be energized by impulses of direct current, an electrical circuit for said electro-magnetic means including a source of direct current, means including a magnetic element normally disposed in close proximity and adapted to be magnetically attracted to the core of the electro-magnetic means, one of said means being movable relatively to the other, and means connected in the electrical circuit with, and actuated by, the electromagnet for periodically interrupting said direct current supply, whereby said electro-magnetic means is periodically energized for causing periodic attraction and engagement of said magnetic element with the core of said electro-magnetic means for controlling the motion of said movable means.

3. In an electrical snubbing device of the character indicated, the combination of electro-magnetic means, including a core, adapted to be energized by impulses of direct current, an electrical circuit for said electro-magnetic means including a source of direct current, means including a yieldable magnetic element normally disposed in close proximity and adapted to be magnetically attracted to the core of the electromagnetic means, one of said means being movable relatively to the other, and means for periodically interrupting said direct current supply, whereby said electro-magnetic means is periodically energized for causing periodic attraction and engagement of said magnetic element with the core of said electro-magnetic means for controlling the motion of said movable means.

4. In an electrical snubbing device of the character indicated, the combination of electromagnetic means, including a core, adapted to be energized by impulses of direct current, an electrical circuit for said electro-magnetic means including a source of direct current, means including a magnetic element normally disposed in close proximity and adapted to be magnetically attracted to the core of the electro-magnetic means, one of said means being movable relatively to the other, and means for periodically interrupting said direct current supply, whereby said electro-magnetic means is periodically energized for causing periodic attraction and engagement of said magnetic element with the core of said electro-magnetic means for retarding the motion of said movable means.

5. In an electrical snubbing device of the character indicated, the combination of electro-magnetic means, including a core, adapted to be energized by impulses of direct current, an electrical circuit for said electro-magnetic means including a source of direct current, means mounted for bodily movement in planes substantially parallel to the face of the core of said electro-magnetic means, said movable means including a movable magnetic element normally disposed in close proximity and adapted to be magnetically attracted to said core, and means for periodically interrupting said direct current supply, whereby said electro-magnetic means is periodically energized for causing periodic attraction and engagement of said magnetic element with the core of said electro-magnetic means for controlling the motion of said movable means.

6. In an electrical snubbing device of the character indicated, the combination of electromagnetic means, including a core, adapted to be energized by impulses of direct current, an electrical circuit for said electro-magnetic means including a source of direct current, means mounted for bodily movement in planes substantially parallel to the face of the core of said electromagnetic means, said movable means including a movable magnetic element normally disposed in close proximity and adapted to be magnetically attracted to said core, and means connected in the electrical circuit with, and actuated by, the electro-magnet for periodically interrupting said direct current supply, whereby said electromagnetic means is periodically energized for causing periodic attraction and engagement of said magnetic element with the core of said electro-magnetic means for controlling the motion of said movable means.

7. In an electrical snubbing device of the character indicated, the combination of electromagnetic means, including a core, adapted to be energized by impulses of direct current, an electrical circuit for said electro-magnetic means means including a source of direct current, means mounted for bodily movement in planes substantially parallel to the face of the core of said electro-magnetic means, said movable means including a yieldable magnetic element normally disposed in close proximity and adapted to be magnetically attracted to said core, and means for periodically interrupting said direct current supply, whereby said electro-magnetic means is periodically energized for causing periodic attraction and engagement of said magnetic element with the core of said electro-magnetic means for retarding the motion of said movable means.

8. In an electrical snubbing device of the character indicated, the combination of electromagnetic means, including a core, adapted to be energized by impulses of direct current, an electrical circuit for said electro-magnetic means including a source of direct current, means mounted for bodily movement in planes substantially parallel to the face of the core of said electro-magnetic means, said movable means including a yieldable magnetic element normally disposed in close proximity and adapted to be magnetically attracted to said core, and means connected in the electrical circuit with, and actuated by, the electro-magnet for periodically interrupting said direct current supply, whereby said electro-magnetic means is periodically energized for causing periodic attraction and engagement of said magnetic element with the core of said electro-magnetic means for retarding the motion of said movable means.

9. In an electrical snubbing device of the character indicated, the combination of electro-magnetic means, including a core, adapted to be energized by impulses of direct current, an electrical circuit for said electro-magnetic means including a source of direct current, means mounted for oscillatory movement in a predetermined path adjacent said electro-magnetic means and including a movable magnetic element normally disposed in close proximity to said core substantially throughout the oscillatory range of movement of said element, and means for periodically interrupting said direct current supply, whereby said electro-magnetic means is periodically energized for causing periodic attraction and engagement of said magnetic element with said core for retarding the oscillatory motion of said oscillatory means.

10. In an electrical snubbing device of the character indicated, the combination of electromagnetic means, including a core, adapted to be energized by impulses of direct current, an electrical circuit for said electro-magnetic means including a source of direct current, means mounted for oscillatory movement in a predetermined path adjacent said electro-magnetic means and including a movable magnetic element normally disposed in close proximity to said core substantially throughout the oscillatory range of movement of said element, and means connected in the electrical circuit with, and actuated by, the electro-magnet for periodically interrupting said direct current supply, whereby said electro-magnetic means is periodically energized for causing periodic attraction and engagement of said magnetic element with said core for retarding the oscillatory motion of said oscillatory means.

11. In an electrical snubbing device of the character indicated, the combination with a measuring device including a calibrated element and an indicator element, one of said elements being movable relatively to the other; of electro-magnetic means including a core, adapted to be energized by impulses of direct current, an electrical circuit for said electro-magnetic means including a source of direct current, means including a magnetic element carried on the movable element of the measuring device and normally disposed in close proximity and adapted to be magnetically attracted to said core, and means for periodically interrupting said direct current supply, whereby said electro-magnetic means is periodically energized for causing periodic attraction and engagement of said magnetic element with said core for dampening the movement of said movable element of the measuring device.

12. In an electrical snubbing device of the character indicated, the combination with a measuring device including a calibrated element and an indicator element, one of said elements being movable relatively to the other; of electro-magnetic means including a core, adapted to be energized by impulses of direct current, an electrical circuit for said electro-magnetic means including a source of direct current, means including a magnetic element carried on the movable element of the measuring device and normally disposed in close proximity and adapted to be magnetically attracted to said core, and means connected in the electrical circuit with, and actuated by, energization of the electro-magnet for periodically interrupting said direct current supply, whereby said electro-magnetic means is periodically energized for causing periodic attraction and engagement of said magnetic element with said core for dampening the movement of said movable element of the measuring device.

13. In an electrical snubbing device of the character indicated, the combination with a measuring device including a calibrated element and an indicator element, one of said elements being movable relatively to the other, and a rotatable shaft on which said movable element is mounted; of an electro-magnet including a core, adapted to be energized by impulses of electrical current, an electrical circuit for said magnet, and means including a magnetic element mounted on and projecting radially from the axis of said shaft, remote from the movable element of the measuring device, said core of the magnet including a cup-shaped element disposed with its marginal edge in close proximity to said magnetic element, whereby energization of the electro-magnet causes said magnetic element to be periodically attracted to the marginal edge of the cup-shaped element of the core for dampening movement of the shaft and the movable element of the measuring device.

14. In an electrical snubbing device of the character indicated, the combination with a measuring device including a calibrated element and an indicator element, one of said elements being movable relatively to the other, and a rotatable shaft on which said movable element is mounted; of an electro-magnet including a core, adapted to be energized by impulses of electrical current, an electrical circuit for said magnet, and means including a pair of magnetic elements mounted on and projecting radially from the axis of said shaft, remote from the movable element of the measuring device, said core of the magnet including a cup-shaped element disposed with its marginal edge in close proximity to said magnetic elements, whereby energization of the electro-magnet causes said magnetic elements to be periodically attracted to the marginal edge of the cup-shaped element of the core for dampening movement of the shaft and the movable element of the measuring device.

15. In an electrical snubbing device of the character indicated, the combination with a measuring device including a calibrated element and an indicator element, one of said elements being movable relatively to the other, and a rotatable shaft on which said movable element is mounted; of an electro-magnet including a core, adapted to be energized by impulses of electrical current, an electrical circuit for said magnet, and means including a magnetic element yieldably mounted on and projecting radially from the axis of said shaft, remote from the movable element of the measuring device, said core of the magnet including a cup-shaped element disposed with its marginal edge in close proximity to said magnetic element, whereby energization of the electro-magnet causes said magnetic element to be periodically attracted to the marginal edge of the cup-shaped element of the core for dampening movement of the shaft and the movable element of the measuring device.

16. In an electrical snubbing device of the character indicated, the combination with a measuring device including a calibrated element and an indicator element, one of said elements being movable relatively to the other, and a rotatable shaft on which said movable element is mounted; of an electro-magnet including a core, adapted to be energized by impulses of direct current, an electrical circuit for said magnet, means including a magnetic element mounted on and projecting radially from the axis of said shaft, remote from the movable element of the measuring device, said core of the magnet including a cup-shaped element disposed with its marginal edge in close proximity to said magnetic element, and means for periodically interrupting the direct current electrical circuit whereby energization of the electro-magnet causes said magnetic element to be periodically attracted to the marginal edge of the cup-shaped element of the core for dampening movement of the shaft and the movable element of the measuring device.

17. The combination of an electro-magnet, having a core, adapted to be energized by impulses of direct current, an electrical circuit for said magnet including a source of direct current, a rotatable disc having a concentric band of magnetic material disposed in close proximity to the core of said magnet, and means for periodically interrupting said direct current electrical circuit, whereby said magnet is periodically energized for causing periodic attraction of said magnetic band of the disc to said core for maintaining a substantially uniform speed of rotation of said disc.

18. The combination of an electro-magnet, having a core, adapted to be energized by impulses of direct current, an electrical circuit for said magnet including a source of direct current, a rotatable disc having a concentric band of magnetic material disposed in close proximity to the core of said magnet, and means connected in said electrical circuit with and actuated by the electromagnet for periodically interrupting said direct current electrical circuit, whereby said magnet is periodically energized for causing periodic attraction of said magnetic band of the disc to said core for maintaining a substantially uniform speed of rotation of said disc.

CHRISTIAN REIMULLER.